March 2, 1926.

W. L. McNAMARA 1,574,914

AUTOMATIC CONVEYER SIGNAL

Filed Oct. 6, 1923

INVENTOR
William L. McNamara
BY
George Ramsey
his ATTORNEY

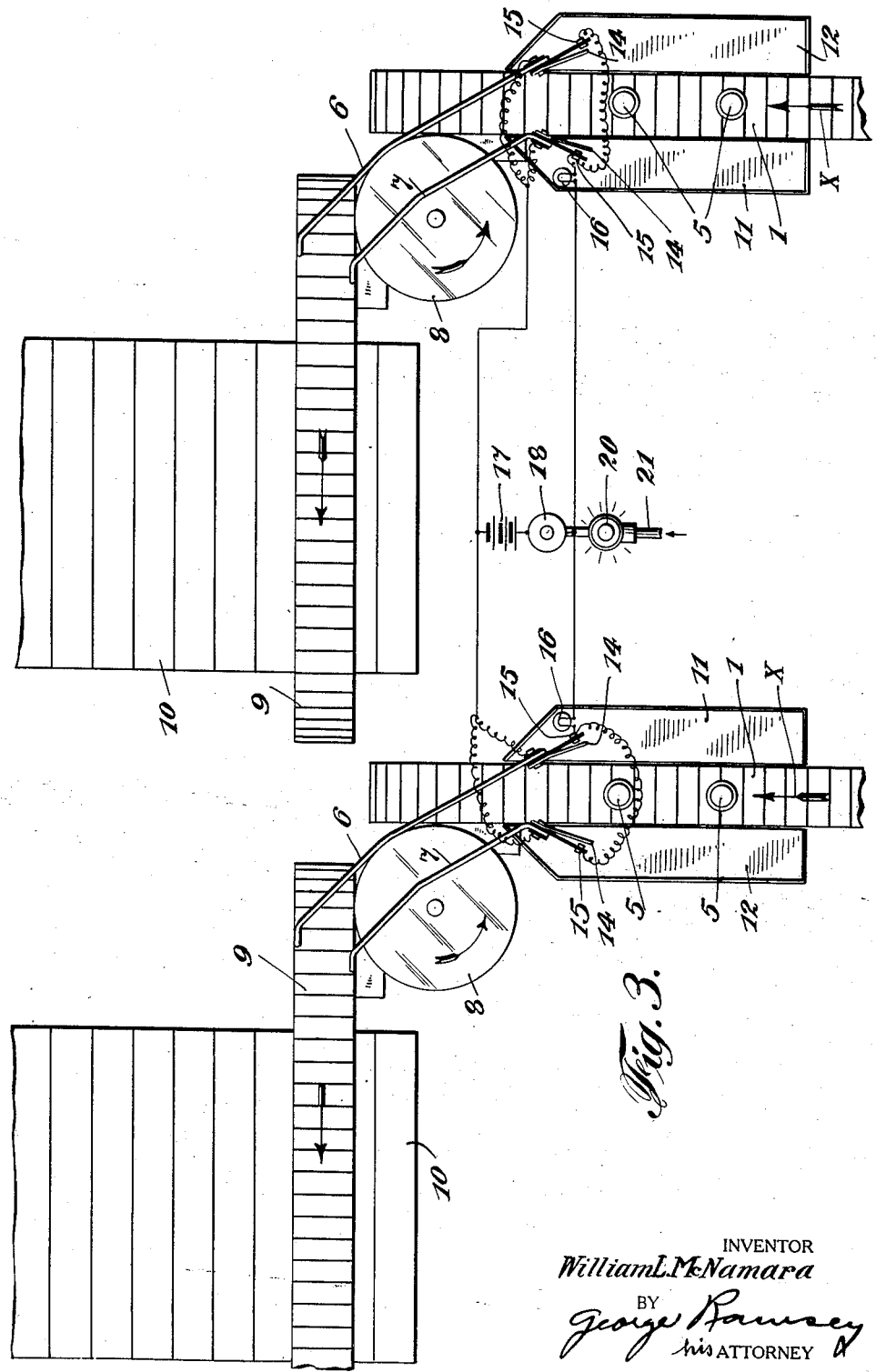

Patented Mar. 2, 1926.

1,574,914

UNITED STATES PATENT OFFICE.

WILLIAM L. McNAMARA, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE.

AUTOMATIC CONVEYER SIGNAL.

Application filed October 6, 1923. Serial No. 666,894.

*To all whom it may concern:*

Be it known that I, WILLIAM L. McNAMARA, a citizen of the United States, residing at Connellsville, in the county of Fayette, State of Pennsylvania, have invented certain new and useful Improvements in Automatic Conveyer Signals, of which the following is a specification.

This invention relates broadly to automatic transferring mechanism and more especially to transfer mechanism adapted for use in glass plants to transfer glass articles from fabricating machines to lehrs.

It is customary in a glass plant to have a main conveyer which serves a plurality of glass machines so that the glassware may occasionally be received by the main conveyer in bunches, that is, the ware from more than one machine may possibly be simultaneously placed on the main conveyer.

The arrangement of glass machines to the ehrs is usually such that the feeding mechanism for the lehr which conveys glass articles to be set on the lehr, requires an angular movement of the glass articles. This angular arrangement in the majority of such conveying devices comprises a straight run main conveyer angularly disposed to a straight run lehr conveyer with a sub-transfer mechanism between the two conveyers. It is desirable that the ware on the lehr conveyer shall be arranged linearly on the conveyer to the lehr bed in such manner as to substantially fill the lehr. This fact makes it desirable to have the ware from the main conveyer straightened out into a substantially uniform linear arrangement when the ware reaches the lehr conveyer. The straightening out operation is usually performed by guide members which will not permit more than one piece of ware to pass side by side onto the furnace lehr conveyer. The close proximity of the guide members therefore makes a restricted throat which may tend to cause bunches of ware on the main conveyer to jam. Since it is customary to run conveyer belts without guards to avoid injury to hot ware before it reaches the throat, the ware which jams up in the throat is liable to be pushed from the conveyer and broken by on-coming ware brought forward by the main conveyer.

The present invention overcomes the difficulties above set forth by providing a pair of shelves on each side of the main conveyer adjacent the front ends of the guides at the transfer point and the ends of the guides are provided with sensitive electrical fingers so that if a jam of ware does occur, an electrical finger is flexed, thereby producing a contact which sets up a signal to attract the operator's attention. The signal may comprise an air operated whistle, since compressed air is a common means of transmission of power in a glass factory. Where a plurality of lehrs are used, thereby requiring a plurality of main conveyers, an electric lamp may be provided on each conveyer with the lamps in circuit with the air whistle so that when the whistle blows the operator is advised by the lighting of a lamp, as to which particular conveyer is jammed. The operator then merely straightens out the jam and places the ware from the shelves back on the conveyer so that it may all go forward in the proper linear movement.

The principal object of the present invention is a safety mechanism for conveyers or the like comprising means to receive surplus articles which may collect on a conveyer due to a jam occurring.

Another object of the present invention is a safety device in combination with a conveyer whereby the operator is notified of jams of articles which occur on a conveyer.

A still further object of the present invention is a signal device operative in combination with a plurality of conveyers whereby the operator is advised of the jam on the conveyers by means of a main signal and is advised of the particular conveyer on which the jam occurs by means of a secondary signal.

A still further and important object of the present invention is the combination of a conveyer for glassware or the like and means whereby the operator is advised when a jam occurs on the conveyer and devices to receive surplus glassware being carried into the jam by the continued operation of the conveyer.

Other objects will in part be obvious and will in part be pointed out hereinafter by reference to the accompanying drawings in which like characters are used to represent like parts throughout the several figures thereof.

Realizing that the present invention may be embodied in constructions other than those specifically illustrated, it is understood that the present disclosure shall be considered as illustrative and not in the limiting sense.

Figure 3 is a diagrammatic view illustrating the invention adapted to a plurality of conveyers serving a plurality of lehrs.

Figure 1:
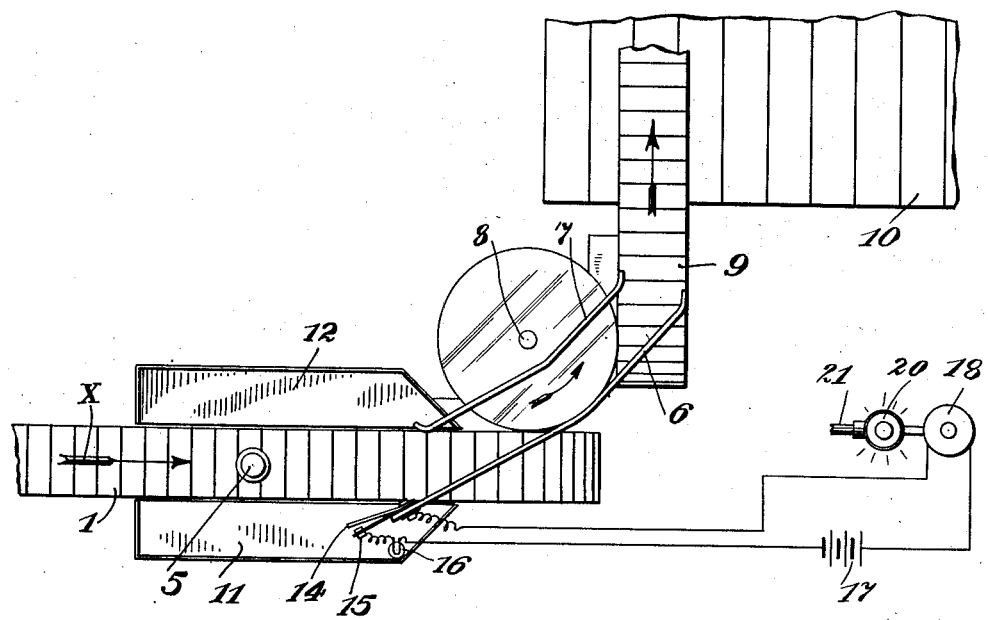
Figure 1 is a diagrammatic plan view illustrating one embodiment of the invention adapted for use on a single lehr conveyer.
Figure 2:
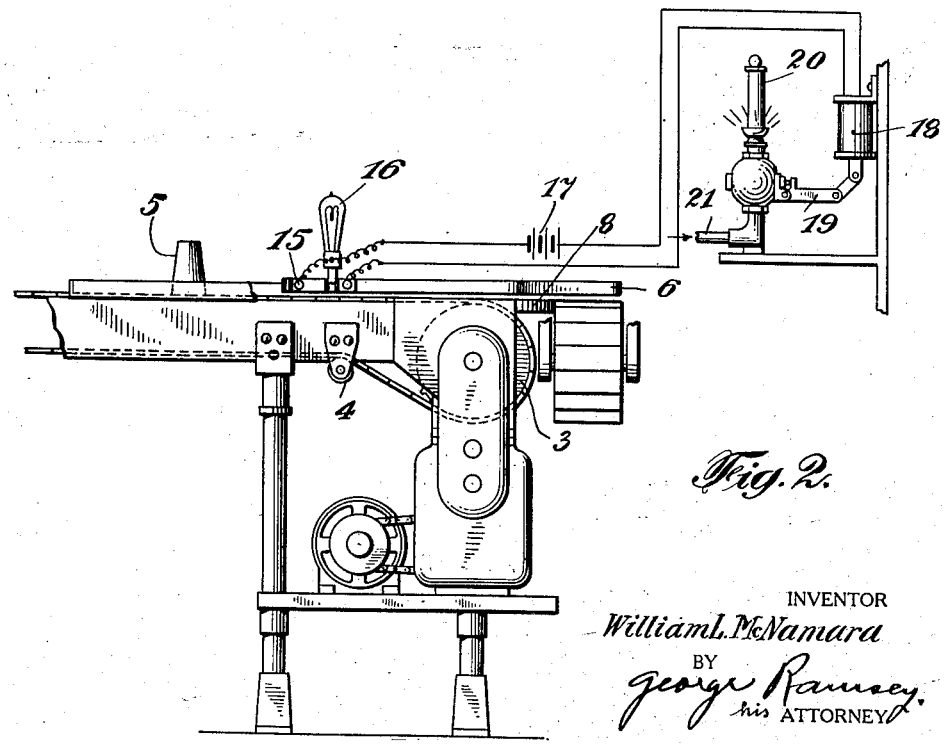
Figure 2 is a diagrammatic elevational view illustrating the form of the construction shown in Figure 1.

Referring now to the drawings and more especially to Figures 1 and 2, a main conveyer 1 may comprise a traveling belt such as is common in the art and is usually formed of a plurality of plates running over suitable guides and driving pulleys such as are diagrammatically shown as a large pulley 3 and a small pulley 4. This main conveyer is adapted to receive glassware or the like from a plurality of glass presses which ware 5 is carried along by the movement of the conveyer in the direction of the arrow X. As the ware goes forward, it encounters an outer guard 6 and is retained in place by an inner guard 7. These guards cause the ware to take a diagonal movement on the main conveyer that transfers the ware to the rotating table top 8 which carries the ware around until it contacts with the inner guard 7 which causes the ware to take a diagonal or radial movement on the table top, thereby transferring the ware to the lehr conveyer 9, which likewise may comprise a traveling belt made of a plurality of plates, such as is common in the art. The lehr conveyer 9 runs over the lehr 10 to which the ware is transferred from the lehr conveyer, by a suitable mechanism.

Extension shelves 11 and 12 substantially level with the main conveyer belt, are arranged on each side of the main conveyer adjacent the forward ends of the guards 6 and 7. When a bunch of articles or ware on the main conveyer is carried to the throat between the ends of the outer guard and the inner guard, it sometimes happens that a plurality of such pieces will be so arranged on the main conveyer as to cause a jam to occur at this point. The continued forward movement of the main conveyer brings on other ware to join those pieces which are clogged between the ends of the guards. The accumulation increases until the pressure is such that the pieces at the sides of the accumulation begin to be pushed off the main conveyer onto the shelves 11 and 12. At this time the pressure on the accumulated mass due to the movement of the main conveyer in the direction of the arrow X causes the ware in the jam to flex a spring finger 14 and bring the free end of this finger against electrical contact 15. This completes a circuit through the spring finger 14, the contact 15, and through an electric light 16 mounted conveniently on the conveyer frame, for example, on the end of the shelf 11 so that an electrical current passing through the lamp will produce a light. This electrical circuit is completed through the battery 17 and a solenoid 18 that is adapted to operate the actuating lever 19 of an air whistle 20 which is connected by a pipe 21 to a source of compressed air, not shown in the drawings.

It will be noted that where the electrical fingers are arranged on each side of the main conveyer, namely, the fingers on the end of the inner guard and also those on the end of the outer guard (as shown in Fig. 3) are electrically connected in parallel so that the contact by either or both of these feelers will complete the electrical circuit to light the lamp and sound the whistle.

In Figure 3 a plurality of conveyer systems are illustrated and a single circuit is shown to electrically operate a single air whistle when a jam occurs on either conveyer. It will be noted, however, that while a single air whistle is shown for a plurality of conveyers, each conveyer is provided with an individual electric lamp. The air whistle operates to advise the attendant that a jam has occurred some place on one or a plurality of conveyers, and the lamp mounted on each individual conveyer that lights notifies the attendant of the particular conveyer on which the jam has occurred so that the difficulty may be immediately corrected and the machines may proceed to operate automatically without interruption. While only two lehr serving conveyer mechanisms are illustrated, it is to be understood that a larger number may be connected in the same manner, so that a single air whistle or main signal may be operative to indicate the particular conveyer which is in difficulty.

Having thus described my invention, what I claim is:

1. In a device for conveying hot glass ware; a first conveyer; a second conveyer angularly disposed to the first conveyer; a rotary transfer device to transfer the ware from the first conveyer to the second conveyer; guiding means cooperating with the transfer device; a pair of shelves substantially level with the first conveyer to support pieces of ware pushed from the first conveyer adjacent the front end of the guiding means, there being a free open path from the first conveyer to said shelves; an electrically operated signal; and a pair of electrical contacts mounted above each of said shelves and connected in circuit with said signal to control the same, said contacts being normally separated and being adapted to be closed by ware pushed against them to set the signal in operation.

2. In a device for conveying hot glass ware; a first conveyer, a second conveyer angularly disposed to the first conveyer; a rotary transfer device to transfer the ware from the first conveyer to the second conveyer; guiding means cooperating with the transfer device; a shelf substantially level with the first conveyer to support pieces of ware pushed from the first conveyer adjacent the front end of the guiding means, there being a free open path from said first conveyer to said shelf; an electrically operated signal; and a pair of electrical contacts mounted above said shelf and connected in circuit with said signal to control the same, said contacts being normally separated and being adapted to be closed by ware pushed against them to set said signal in operation.

3. In a system for conveying hot glass ware; a plurality of first conveyers; a plurality of second conveyers, one being angularly disposed to each of the first conveyers; rotary transfer devices for transferring the ware from the first conveyers to the second conveyers; guiding means cooperating with the transfer devices; shelves substantially level with the first conveyers to support pieces of ware pushed from those conveyers adjacent the front ends of the guidings means, there being free open paths from the first conveyers to the shelves; pairs of electrical contacts mounted above said shelves, said contacts being adapted to be closed by ware pushed to the shelves, an audible signal connected to be set in operation by the closing of any of the pairs of contacts; a plurality of visual signals, one corresponding to each of said first conveyers, said visual signals being connected for selective operation to indicate which one of the first conveyers ware has been pushed from.

4. In a device for conveying hot glass ware; a conveyer; a rotary transfer device for transferring ware from said conveyer; guide rails cooperating with said rotary transfer device, shelves adjacent the front end of said rails to support ware pushed from the conveyer; electrical contacts attached to the front ends of said guide rails, said contacts being normally open and being adapted to be closed by ware pushed from the conveyer; and signalling means connected to be set in operation by the closing of the contacts.

5. In a device for conveying hot glass ware; a conveyer; a rotary transfer device for removing the ware from said conveyer; a guide rail cooperating with said transfer device; a shelf adjacent the front end of said guide rail to support pieces of ware pushed from the conveyer; a pair of normally separated electrical contacts mounted on the front end of said guide rail, said contacts being adapted to be closed by ware pushed from the conveyer; and signalling means connected to be set in operation by closing of the contacts.

6. In a system for conveying hot glass ware; a plurality of first conveyers; a plurality of second conveyers, one associated with each of the first conveyers; transfer devices for transferring the ware from the first conveyers to the second conveyers; shelves substantially level with the first conveyers to support pieces of ware pushed from those conveyers adjacent the transfer device, there being free open paths from the first conveyers to the shelves; a pair of electrical contacts associated with each shelf to be actuated by ware pushed to the shelf; an electric lamp mounted near each of the first conveyers, each lamp being connected to said contacts for selective operation to indicate the pushing of ware from its particular conveyer; and a common audible signal connected to be set in operation by closing of any of the contacts, to notify an operator that ware has been pushed from some one of the first conveyers.

WILLIAM L. McNAMARA.